June 27, 1961 R. L. JAESCHKE 2,990,042
TORQUE INTERCHANGE APPARATUS
Filed June 11, 1959 2 Sheets-Sheet 2

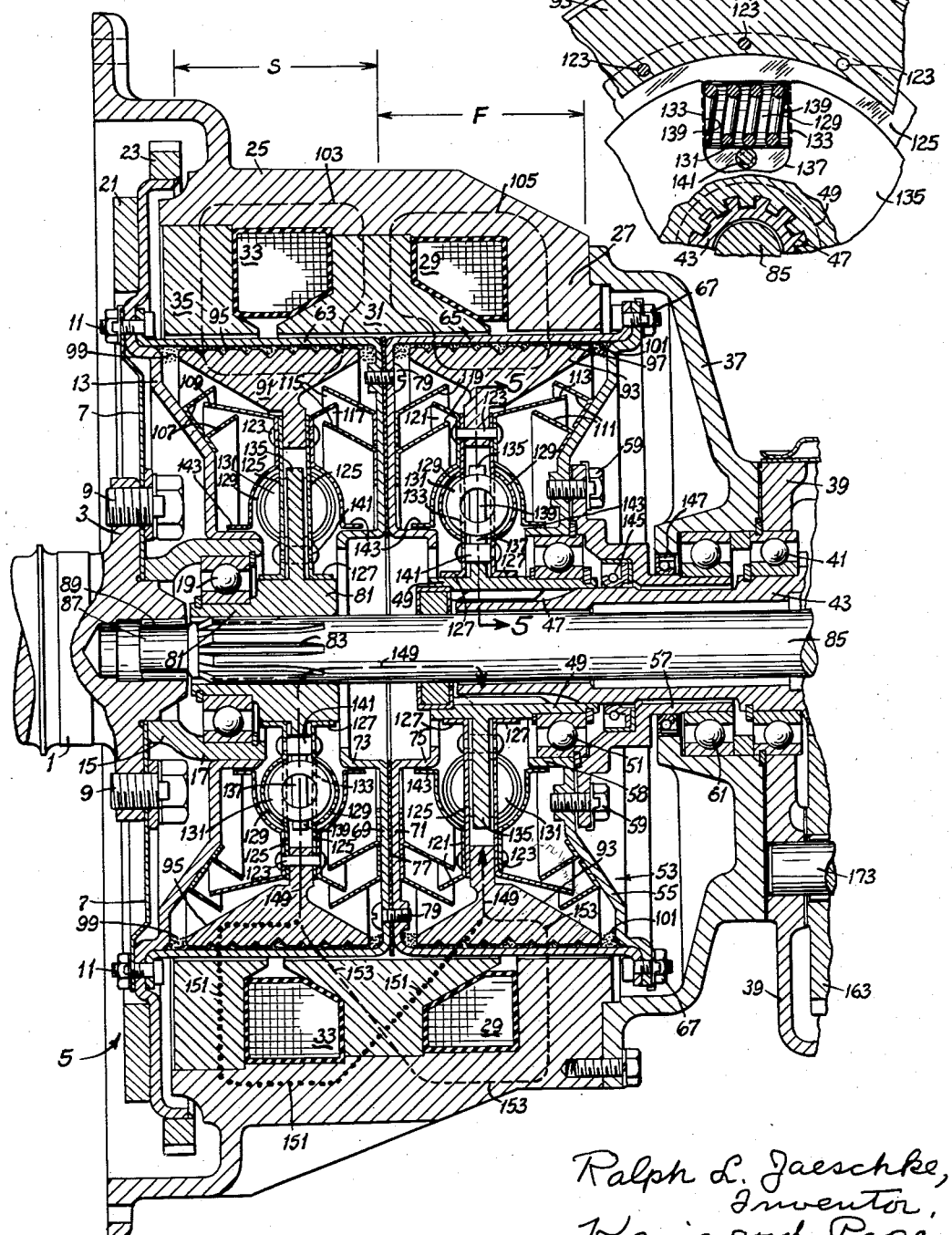
June 27, 1961     R. L. JAESCHKE     2,990,042
TORQUE INTERCHANGE APPARATUS
Filed June 11, 1959     2 Sheets-Sheet 1
Ralph L. Jaeschke,
Inventor,
Koenig and Pope,
Attorneys.

Ralph L. Jaeschke
Inventor
Koenig and Pope
Attorneys

United States Patent Office 2,990,042
Patented June 27, 1961

2,990,042
TORQUE INTERCHANGE APPARATUS
Ralph L. Jaeschke, Kenosha, Wis., assignor to Eaton Manufacturing Company, Cleveland, Ohio, a corporation of Ohio
Filed June 11, 1959, Ser. No. 819,639
4 Claims. (Cl. 192—21.5)

This invention relates to torque interchange apparatus, and with regard to certain more specific features, to compound toroidal magnetic field apparatus of this class.

Among the several objects of the invention may be noted the provision of a compound electric clutch drive of the single input, dual output type improvedly applicable to automotive transmissions and analogous apparatus; the provision of apparatus of the class described wherein certain cross leakage of flux between toroidal magnetic field clutches or the like and so-called crossover torque between them are prevented; the provision of compound apparatus of the class described, wherein certain deleterious drag effects of a deexcited element by flux leakage from an excited element are prevented; the provision of apparatus of the class described adapted to increase the life of synchronizer and similar elements of torque-changing transmissions used therewith; and the provision of apparatus of this class which is simple and economical to construct. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, FIG. 1 is an axial section of an electric clutch illustrating the invention;

FIG. 5 is an enlarged detail cross section taken on line 5—5 of FIG. 1.

Corresponding reference characters indicate corresponding parts throughout the several views of the drawings.

Figure 3:
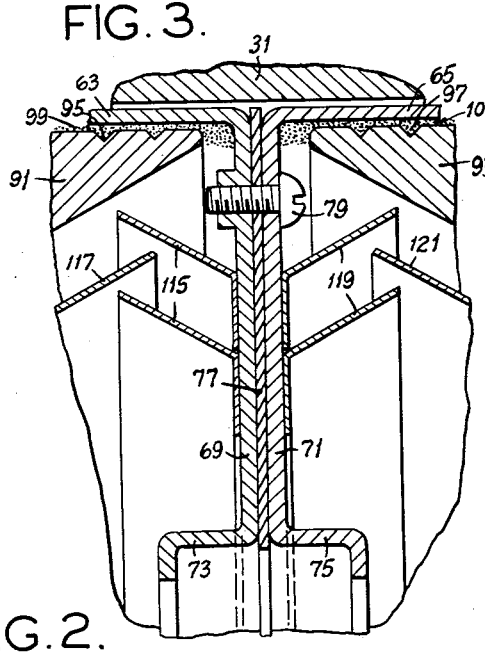
FIG. 3 is an enlarged detail of a portion of FIG. 1.

The term toroidal magnetic field clutch as used herein comprehends analogously operative toroidal magnetic field brakes, dynamometers and the like. Electric clutches, brakes, dynamometers and the like fall into various categories, including magnetic particle clutches such as are used herein to illustrate the invention, but it is to be understood that the invention is also applicable to similar clutches such as, for example, eddy-current clutches which do not employ magnetic particles in the magnetic flux paths. The invention will be described in connection with a so-called single input, dual output type of apparatus functioning as a compound clutch, but it is to be understood that it is also applicable to arrangements incorporating electric braking means wherein there is an input member, an output member and an electric brake, it being understood that in this art electric brakes may sometimes have the form of electric clutches, the two being equivalents insofar as the present invention is concerned.

Referring now more particularly to FIG. 1, there is shown at numeral 1 a torque input member which in the present example may be considered to be the crankshaft of an automotive engine. This shaft 1 is flanged, as shown at 3, for support thereon of a flywheel assembly, indicated generally by the numeral 5. Flywheel assembly 5 includes a relatively thin dished plate 7, attached to flange 3 by means of bolts 9.

Attached to the periphery of plate 7 by means of bolts 11 is a flywheel member 13 which internally supports a cup 15 for rotation with the shaft 1 and for support of the outer race 17 of a bearing 19. Near its periphery the member 13 carries a flywheel ring 21 and the usual starter ring gear 23. At 25 is shown a stationary (nonrotary) ferromagnetic casing, formed at one end as an annular pole ring 27. Adjacent the pole ring is an annular field coil 29 which is flanked by an intermediate ferromagnetic annular pole ring 31. Next to the intermediate ferromagnetic pole ring 31 is a second annular field coil 33, flanked by a third ferromagnetic annular pole ring 35. Parts 25, 27, 29, 31, 33 and 35 are all joined in a rigid, nonrotary assembly. Parts 25, 27, 31 and 35 are continuously ferromagnetic throughout, no nonmagnetic divider being used between the coils 29 and 33, such as would complicate the construction and assembly of these relatively heavy parts. Suitable D.C. control circuits (not shown, because known to the art) are wired to coils 29 and 33 for exciting and de-exciting them, respectively.

Figure 2:
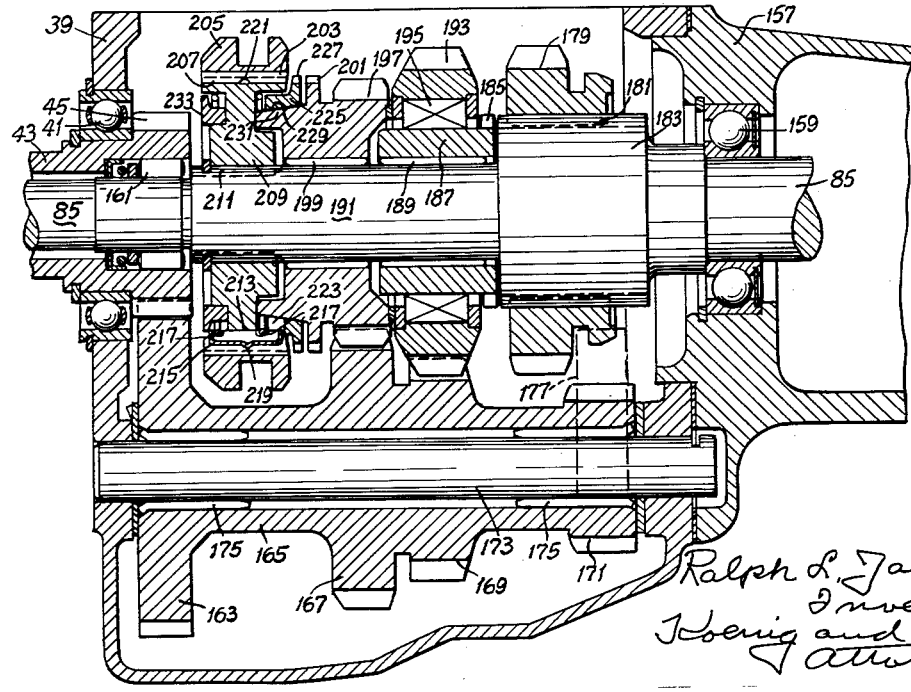
FIG. 2 is an axial section of a typical synchromesh torque-changing transmission useful with the apparatus illustrated in FIG. 1.

Attached to the casing 25 is an enclosure 37, to which is attached a case 39 of a synchromesh transmission shown more particularly in FIG. 2. Supported upon a bearing 41 in case 39 is a hollow quill 43, having a pinion 45 within the case 39. This quill 43 may be referred to as a first output member of the compound clutch as a whole. The opposite end of the quill 43 is splined, as shown at 47, to a driven hub 49 of what may be referred to as a first electric clutch unit F. This hub 49 is located in a bearing 51 in a drum assembly lettered in general as 53. The left-hand end of this assembly is the above-mentioned flywheel member 13. The right-hand end is constituted by a head 55, to which is exteriorly held a nosepiece 57 supported by bolts 59. The nosepiece 57 is supported within the enclosure 37 by means of bearing 61. An inner nose portion 58 extends from head 55 and carries said bearing 51.

Between the flywheel member 13 and head 55 are supported two ferromagnetic drums or cylinders 63 and 65. Drum 63 is attached to the flywheel member 13 by means of the above-mentioned bolts 11. The drum 65 is held to head 55 by means of bolts 67. The drums 63 and 65 have internally directed end plates 69 and 71, respectively, which carry oppositely directed short hollow hubs 73 and 75, respectively. Drums 63 and 65 and their respective end plates 69 and 71 form integral cup-shaped members which may be identified as 63, 69 on the one hand and 65, 71 on the other hand. These cup-shaped members have adjacent central openings formed in their end plates by the hollow hubs 73. Interposed between the plates 69 and 71 is a nonmagnetizable barrier ring 77, composed for example of stainless steel, brass, copper, aluminum or the like. The plate members 69, 71 and barrier 77 are held together by screws 79, also preferably not magnetizable. From the above it will be apparent that the drum assembly 53 is constituted by the end member 13 supported upon bearing 19, the drums 63 and 65 joined by screws 79, and the right end member 55, supported upon bearing 61. This drum assembly 53 is driven by the torque input shaft 1.

The inner race of the bearing 19 is supported around a hub 81 of what will hereinafter be referred to as a second electric clutch unit S. The hub 81 is splined, as shown at 83, on the end of an output shaft 85 which may be referred to as the second output member of the clutch assembly. A stub end 87 of the shaft 85 is located in a pilot bearing 89 within the flanged hub 3.

Within the drum parts 63 and 65 of clutch units S and F, respectively, are located ferromagnetic inductor drum parts 91 and 93, respectively, the axial sections of which are reverse images of one another. The outsides of these drums are cylindric and grooved, as shown at 95 and 97, respectively, providing small grooved magnetic gaps between them and the respective drum parts. Another small magnetic gap exists between the outsides of the drums 63 and 65 and the insides of the pole rings 27, 31 and 35. A charge of finely divided ferromagnetic material or powder is carried in each drum 63 and 65, as indicated at 99 and 101, respectively.

When coil 33 is excited, a toroidal magnetic loop such as diagrammatically illustrated at 103 is generated, interlinking parts 25, 31, 63, 91 and 35. This draws the contained ferromagnetic powder charge 99 into the gap between parts 91 and 63 while at the same time increasing the shear strength of the powder charge, so as to effect a driving connection between parts 63 and 91. When coil 33 is deexcited, this toroidal field 103 disappears, allowing free relative motion between parts 63 and 91. When coil 29 is excited, a toroidal magnetic loop such as diagrammatically illustrated at 105 is generated, interlinking parts 25, 27, 65, 93 and 31. This draws the ferromagnetic powder charge 101 into the gap between parts 93 and 65 while at the same time increasing the shear strength of this powder charge 101, so as to effect a driving connection between parts 93 and 65. When coil 29 is deexcited, this toroidal field 105 disappears, allowing a free relative motion between parts 65 and 93.

The purpose of the nonmagnetic barrier ring 77 is to prevent the magnetic toroidal loop 103, when formed, from including part of the drum 65; and conversely, to prevent the magnetic toroidal loop 105, when formed, from including part of the drum 63, which these would otherwise do.

Normally the powder charges 99 and 101 are centrifugally distributed inside of the drums 63 and 65, respectively, when shaft 1 rotates. To prevent the ferromagnetic powder charges 99 and 101 from escaping at standstill, labyrinth seals are employed as follows: Conical cups 107 on member 13 interdigitate with a conical cup 109 carried on drum 91. Conical cups 111 on member 55 interdigitate with a conical cup 113 carried on drum 93. Conical cups 115, carried on plate 69, interdigitate with a conical cup 117 carried on drum 91. Conical cups 119, carried on plate 71, interdigitate with a conical cup 121 carried on drum 93.

Drums 91 and 93 are connected with their respective hubs 81 and 49 by torque vibration dampers which are identical. The description of one of them will therefore suffice for both. The one to be described is illustrated in detail in FIG. 5. Thus each hub 91 and 93 has riveted to it (by the same rivets 123 which hold their respective labyrinth members) spaced radial plates 125. Inner flanged portions 127 of these plates are rotary on the respective hubs 81 and 49. Riveted spacing pillars 141 maintain the proper distance between the members of the respective pairs of plates 125. Each plate 125 is punched out transversely to provide a notch, as shown at 129, so as to hold captive in the notch a coil spring 131. Thus each coil spring 131 is confined within the punched-out portions 129 and the punched edges 133 of the portions 129 (FIG. 5).

From the hubs 81 and 49 extend plates 135, located between the pairs of plates 125, respectively. Plates 135 are notched, as shown at 137, to provide opposite edges 139, which also engage the ends of the captive springs 131. Thus when either drum 91 or 93 is driven, torque may be transmitted to the respective hub 81 or 49, as the case may be, through a group of the springs 131, which act as vibration dampers. Further description of these parts will be unnecessary, since the general forms of such vibration dampers are known in the art.

As shown in FIG. 1, the labyrinth seal plates 117, 121, 109 and 113 are bulged outwardly and flanged at their inner peripheries, as shown at 143, to act as seals. Additional seals are shown at numerals 145 and 147.

All of the parts between drum 93 and the quill 43 are composed of nonmagnetic material such as stainless steel. These parts are cups 113 and 121, plates 125, and also plates 135 and hub 49, including fasteners 123 and 141. Springs 133 are preferably also composed of nonmagnetic material, such as Phosphor bronze. However, in view of the nonmagnetic character of all other parts surrounding these springs, they may be made of steel. These nonmagnetizable parts, along with the nonmagnetic barrier ring or shield 77, are important features of the invention for the following reasons:

Toroidal field 103 when formed is prevented from entering drum 65 and looping back to drum 63; and toroidal field 105 when formed is prevented from entering drum 63 and looping back through drum 65. This is the shielding function of the shield ring 77 between drum parts 63 and 65. The function of the stainless steel vibration damper parts supporting drum 93 on the quill 43 is to prevent either magnetic loop 103 or 105 from passing around the magnetic barrier formed by shield ring 77, thus preventing either one from passing through both drums 63 and 65 at the same time. The possible magnetic loop that is thus prevented from forming by the stainless steel parts supporting drum 93 is partly illustrated by the long dash lines 149 at the bottom of FIG. 1, the magnetic circuit being broken across the arrowheads of these dash lines. It will be understood that the magnetic circuit, of which 149 is a part, if not broken might be otherwise completed as shown by the potential leakage-circuit dots 151 in connection with coil 33, or the short leakage-circuit dash lines 153 in connection with coil 29 (see the bottom of FIG. 1). With the break illustrated by the arrowheads in loop 149, such potential cross leakage circuits cannot form. It will be understood that the corresponding vibration damper parts of drum 91 might be made nonmagnetic instead of those of drum 93, as described. Or both vibration damper parts might be nonmagnetic.

In view of the above, it will be seen that when the input shaft 1 is driven, the drums 63 and 65 will be driven as a double-compartmented drum unit. As long as coils 29 and 33 are deexcited, there will be no driving connection with either drum 91 or 93, since no magnetic particles 99 or 101 will be magnetized. If coil 29 is excited, then particles 101 will be magnetized and drum 93 will be driven, so as to drive the quill or first output member 43. On the other hand, when the coil 33 is excited (coil 29 deexcited), particles 99 will be magnetized and drum 91 will be driven, so as to drive the shaft or second output member 85. In either case the magnetic circuits such as illustrated at 103 and 105 at the top of FIG. 1 will respectively be maintained upon excitation of the respective coils, without cross leakage between drums 63 and 65 and therefore without transmission of parasitical cross torque such as might occur if the leakage circuit suggested at the bottom of FIG. 1 could be completed between the arrowheads along the long dash lines 149 (bottom of FIG. 1).

Important utility of the invention will appear from the following: In FIG. 2 is shown a synchromesh transmission to be driven from the clutch shown in FIG. 1. It has the forward bearing 41 in its case 39 for supporting the rear end of the quill 43 on which is the pinion 45, which is hollow. This pinion rotates when drum 93 rotates. In an extension 157 of the case is a rear bearing 159 for the rear end of the shaft 85, which rotates when drum 91 rotates. A pilot bearing 161 is employed between the hollow pinion 45 and the intermediate portion of this shaft 85. The pinion 45 is meshed with a low-speed gear 163 formed on a gear cluster 165 having successively a second-speed gear 167, a third or low-speed gear 169, and a reverse gear 171. Reverse gear 171 meshes with a conventional reverse idler gear 177. The cluster 165 is mounted on bearings 175 on a countershaft 173. When the pinion 45 turns, so do the gears 163, 167, 169, 171 and 177.

A reverse follower gear 179 is splined at 181 to an enlarged portion 183 of shaft 85 and by a suitable shifting fork may be moved rearward from the intermediate position shown to mesh with the reverse gear 177; or forward until its internal splines form an internal crown coupling with teeth 185 on a sleeve 187 rotatable on needle bearings 189 on a portion 191 of shaft 85. A first follower gear 193 is carried on sleeve 187 by means of overrunning clutch members 195. This gear 193 is in constant mesh with gear 169.

A second-speed follower gear is shown at 197, adapted freely to rotate on part 191 of shaft 85 by means of needle bearings 199. This gear 197 is in constant mesh with gear 167. The gear 197 includes crown teeth 201, adapted to be engaged by internal splined teeth 203 of a synchromesh ring 205. This ring is splined to outside teeth 207 of a hub 209, which is keyed at 211 to section 191 of shaft 85. Spaced slots 213 in hub 209 accommodate detent plates 215, biased outward by means of annular springs 217. (While several sets of slots 213 and plates 215 are employed, only one set appears in FIG. 2.)

Dimples 219 in the plates 215 engage in recesses 221 in adjacent inner teeth 203. Each plate 215 has its right-hand end located in an axial notch 223 of a blocker ring 225 having external teeth 227 of the same diametral pitch and size as the teeth 201 associated with gear 197. The inside of the blocker ring is conical, as shown at 229, for frictional engagement with an external cone 231 forming part of the follower gear 197. A ring 233, attached to hub 209, confines the detent plates 215.

When the ring 205 and hub 209 are in the position shown in FIG. 2, the gear 197 is free from shaft 85. When the ring 205 is shifted to the right, its action first is to drive plates 215 and blocker ring 225 to the right. This engages the conical surfaces 229 and 231 and synchronizes the gear 197 with the ring 225. Since the plates 215 are loose in the notches 223, the blocker ring then angles into semiblocking position of its teeth 227 with the teeth 203. Thus the play between the notches 223 and the ends of the spring plates 215 permits this preliminary blocking action of the teeth 227 before ring 205 is also synchronized. The purpose of the blocker ring is to delay complete shifting of ring 205 sufficiently to assure complete synchronization before subsequent positive coupling. After it is synchronized, the ring 205 becomes forced further to the right, thus skewing the ring 225 out of blocking position due to tooth end chambers. During this event, dimples 219 release. Then teeth 203 may pass through between teeth 227 and enter into crown coupling with the teeth 201. Thus after synchronization, gear 197 is crown-coupled to the hub 209, which is keyed to the part 191 of shaft 85.

Further details of the transmission and of the interlocking controls between the shifter mechanisms for ring 205, gear 179 and exciter switches for coils 29 and 33 are not given herein, since they form no part of the present invention per se. It suffices to say that when coil 29 is excited, clutch F drives and gear 179 is moved to the left to engage its internal splined teeth 181 with teeth 185, then the clutch and transmission are in low-speed drive condition. The drive is then from shaft 1 through drum 93, quill 43, gears 45, 163, 169, 193, overrunning clutch members 195, sleeve 187, gear 179 to shaft 85 through splines 181. It will be understood that shaft 85 to the right of FIG. 2 passes to an automotive drive shaft.

To effect second-speed drive, coil 29 is or remains excited and ring 205 is shifted to the right, thus through the synchronizing operation above described connecting gear 197 with hub 209. Second-speed drive then is through gears 45, 163, 167, 197, synchronizer teeth 201, 203, hub 209 to shaft 85 through splines 211. It will be seen that if any of the toroidal field 105 of coil 29 were to loop through the drum 91 of clutch A, this would cause parasitic drag action between the hub 209 and the gear 197, thus tending prematurely to wear out the synchronizer. By preventing such parasitic drag action, the lives of the synchronizing parts are substantially extended. Whether or not gear 179 is decoupled from teeth 185 during second-speed operation depends upon the type of control used. If it is not decoupled, sleeve 187 overruns gear 193 because of the overrun allowed by members 195.

For high- or direct-drive operation, coil 29 of clutch B is deexcited and coil 33 of clutch A is excited. This drives drum 91, shaft 85, ring 205 at this time being moved to the left, thus releasing gear 197 from shaft 85 for idling around shaft 85.

For reverse-gear operation, coil 29 is excited and gear 179 moved to the right in mesh with idler gear 177. The drive is then through gears 45, 163, 171, 177, 179, splined teeth 181 to shaft 85.

It will be seen that in any change-speed operation involving the synchronizer, no parasitic drag is effected by any cross leakage of flux between the drums of clutches S and F, thus extending the life of the synchronizer. More broadly, the invention is useful to prevent inconsistent parasitic actions by one clutch S or F with respect to the other, such as might have equally deleterious action on connected apparatus like the synchronizer in the sense that such connected apparatus should be protected from inconsistent actuation from the respective clutches.

Figure 4:
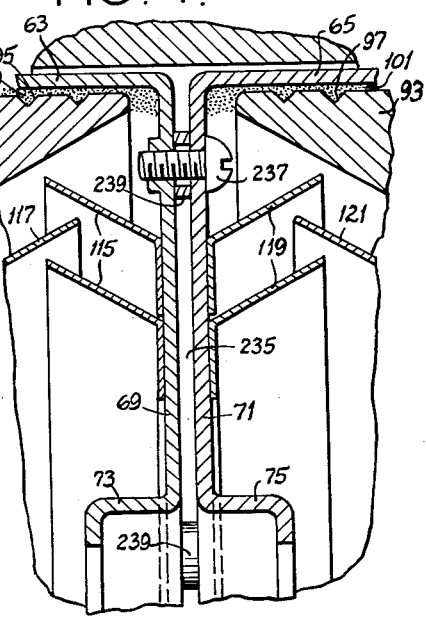
FIG. 4 is a view similar to FIG. 2, showing a modification.

In FIG. 4 is shown a modified method of minimizing parasitic cross-flux leakage between coils 29 and 33 and drums 91 and 93, respectively. In this case the intermediate drums 63 and 65 are separated by an air space 235, being held together by nonmagnetic screws 237 and held apart by means of nonmagnetic spacing washers 239. The air space 235 serves the purpose of blocking passage of flux from one drum 63 or 65 to the other, practically the same as does the nonmagnetic shield 77.

It will be understood that wherever nonmagnetic materials are mentioned herein they may be any one of a number of the same, such as stainless steel, copper, brass, aluminum or the like. It will also be understood that the invention is useful in conection with alternately operative electric clutches and brakes insofar as the same parasitic-magnetic-field problems are presented in their organization that are presented by the organization of several clutches as herein described. Thus paired magnetic-particle, eddy-current clutches and brakes having adjacent toroidal magnetic fields looping adjacent inductor drums in closely adjacent cylinders present the same problem solved by means of the present invention. A generic term for these in the following claims will be torque interchange apparatus.

It will be noted that while torque transmission may be interchanged between the closely adjacent toroidal magnetic field clutches S and F of FIG. 1 by exchanging excitation of coils 29 and 33, without parasitic torque involvement, neither clutch is a torque multiplier per se. This is because there are no torque multiplying means between their driving elements 63 or 65 and their driven or reaction elements 91 or 93, respectively. Torque multiplication per se is accomplished in the gear box of FIG. 2.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

I claim:

1. A compound magnetic particle clutch comprising a casing, a drive member and two driven members supported in said casing, magnetizable inductor drums, means connecting said drums with said driven members, respectively, at least one of said connecting means including a nonmagnetic barrier to a magnetic path, a pair of separate magnetizable cup-shaped members each of which is formed by a radial end plate and a cylindrical portion extending therefrom to an open end, means joining said end plates so as to provide a radially extensive space therebetween, a nonmagnetic substance occupying said space and forming a substantial barrier to a magnetic path, said cylinders being arranged to extend in opposite directions and spacedly surrounding said drums, radial closure and support means for the open ends of said cup-shaped members, one of which radial support means is connected with the drive member, said radial end plates and closure means along with said cup-shaped members forming individual compartments, each compartment containing an inductor drum, finely divided ferromagnetic material in the respective compartments, a ferromagnetic field member surrounding said cup-shaped members and individual annular field coils located in the field member substantially in the planes of said inductor drums and cylindrical portions of the cup-shaped members.

2. A clutch according to claim 1, wherein the radial plate and the cylindrical part of each cup-shaped member are integral.

3. A clutch according to claim 1, wherein each of said connecting means of said inductor drums includes a vibration damper, the damper in the nonmagnetic connecting means comprising nonmagnetic parts therein.

4. A clutch according to claim 1, wherein the radial plate and the cylindrical part of each cup-shaped member are integral, and wherein each of said connecting means of said inductor drums includes a vibration damper, the damper in the nonmagnetic connecting means comprising nonmagnetic parts therein.

References Cited in the file of this patent

UNITED STATES PATENTS

| 2,752,021 | Trickey | June 26, 1956 |
| 2,839,170 | Grant | June 17, 1958 |
| 2,867,127 | Fehr | Jan. 6, 1959 |

OTHER REFERENCES

Automobile Engineer, September 1957, pages 370–378 inclusive.